Jan. 26, 1965  M. D. TUPPER  3,167,672
SLEEVE BEARING MOUNTING ARRANGEMENT IN AN ELECTRIC MOTOR
Filed Oct. 27, 1960  2 Sheets-Sheet 1
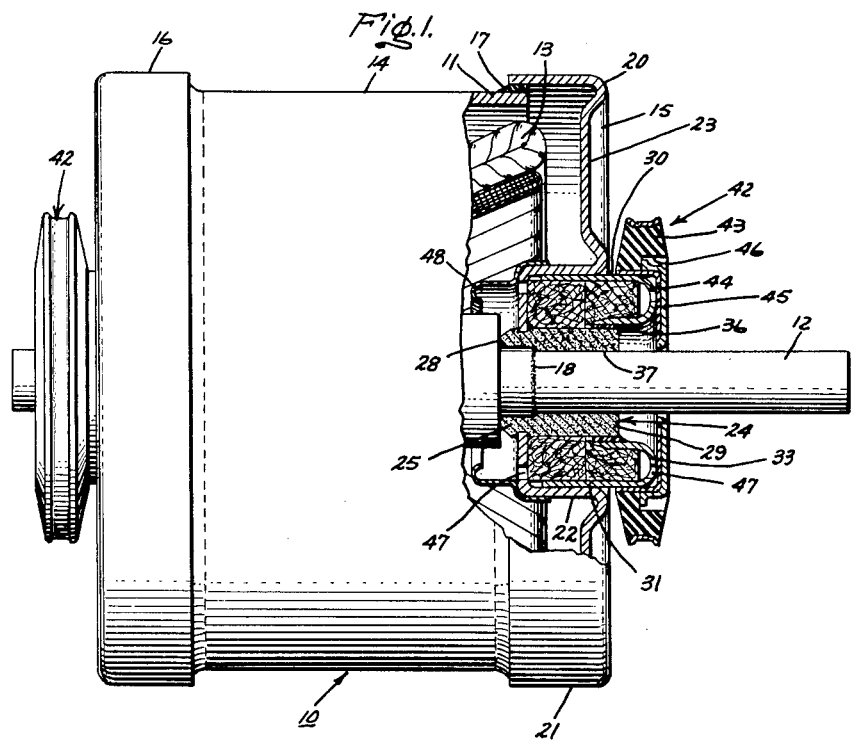
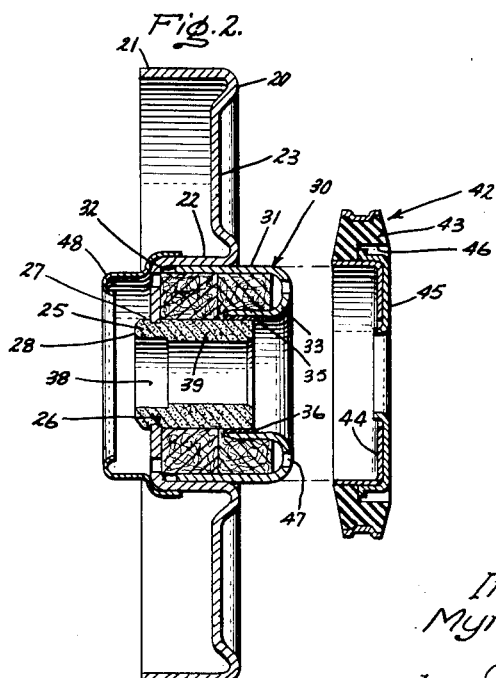
Inventor:
Myron D. Tupper,
by John M. Stoudt
Attorney.

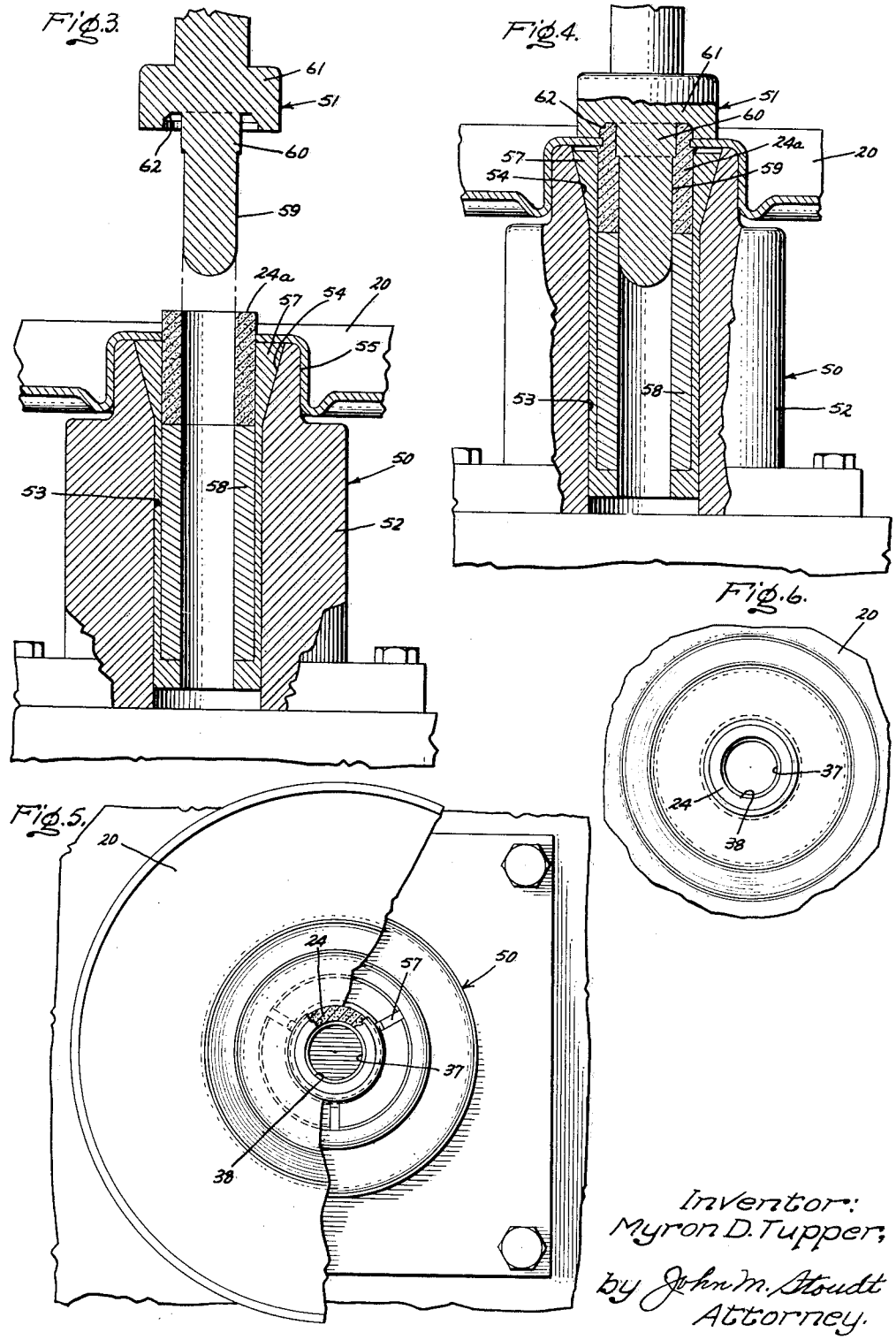

United States Patent Office 3,167,672
Patented Jan. 26, 1965

3,167,672
SLEEVE BEARING MOUNTING ARRANGEMENT
IN AN ELECTRIC MOTOR
Myron D. Tupper, Fort Wayne, Ind., assignor to General
Electric Company, a corporation of New York
Filed Oct. 27, 1960, Ser. No. 65,338
5 Claims. (Cl. 310—90)

This invention relates to electric motor construction and more particularly to an improved end shield assembly and manner for mounting sleeve type bearings in the same.

One common form of an electric motor is a fractional horsepower induction type including a stator, a rotatable member or rotor secured to a shaft, and an end shield member formed of sheet material arranged at each end of the stator. A sleeve type bearing, usually of the molded sintered variety, is attached to each end shield member, either with the use of a relatively complicated and expensive bearing supporting structure, such as that disclosed in the B. A. Benson Patent 2,272,029 or by an arrangement in which only one end of the bearing is directly secured to the end shield member; i.e., by staking or the like, providing the only means of support for the bearing.

Although the staked construction is highly desirable, both as to the simplicity of design and to the type of low cost manufacturing procedures involved in the production thereof, the methods of fastening the end of the bearing to the end shield and the resulting structure have not been entirely satisfactory for one reason or another. For example, in one method, a sleeve type sintered bearing is initially formed with a pre-size, accurately dimensioned bore, and then is finally assembled and secured onto the end shield member by a staking process. However, during the final assembly step, the accurately finished bore surface, attained during the prior manufacturing procedures, is destroyed to some extent, often rendering the journal surface of the bearing into a barrel shape which impedes the free rotation of the shaft. In addition, due to the fact that sleeve type sintered bearings have a low degree of structural strength, the staking of the bearing to the supporting structure introduces stresses into the bearing at the place of securement, causing the journal surface to assume an oval shape at that point. This distortion may result in premature bearing failure as well as poor motor performance, for the interference experienced by the revolving rotor shaft with the shaft carrying bearings, is a factor which determines proper shaft rotation and journal friction, especially significant in the operation of high speed motors. Moreover, when bearings are supported at only one end, they have a tendency to become loose during motor operation thereby causing misalignment of the bearings and shaft.

In the larger size fractional and small horsepower motors, resilient mountings are conventionally used to cushion the vibrations of the motors and to support the motor on a stationary base. These mountings are subjected to torsional and axial forces during motor operation, requiring a rigid mounting structure, and when employed with the structurally weak sintered sleeve type bearings, the resilient mounting and bearing supporting structure have usually been entirely separate structures formed of separate parts, even though their physical proximity on the end shield makes it desirable to provide a structure which not only helps to support the sleeve type bearing, but also serves to hold in a rigid fashion the resilient mounting.

Accordingly, it is an object of the present invention to provide an electric motor which an improved low cost simply constructed end shield assembly having the desired degree of bearing support rigidity even though a sleeve type bearing is employed.

It is a further object of the invention to provide an improved low cost end shield assembly in which a sintered sleeve type bearing has one of its ends secured and supported on an end shield member of sheet material by the highly desirable staking construction, yet one in which the bearing is rigidly secured without adversely affecting the journal surface of the bearing.

Another object of the invention is the provision of an improved end shield assembly in which the same structure assists in holding the sleeve type bearing in place and also functions to support the resilient motor mounting in a stationary and rigid fashion.

In carrying out the objects of my invention in one form thereof, I provide an improved end shield assembly for supporting a rotor shaft in which an end shield member, stamped out of rigid sheet material, has a generally cup-shaped wall section defining a recess. A substantially cylindrical sleeve type porous sintered powdered bearing has one of its ends extending through an aperture in the wall section and staked thereto for support and has its other end projecting through an aperture in a second member, generally cup-shaped in configuration, which is in turn secured within the recess to the wall section of the end shield member. The inner surfaces of the wall section and of the second member, together with the outer surface of the sintered bearing, define a lubricant reservoir cavity which is filled with lubricant retaining means. The sintered powder bearing is formed with an enlarged bore from the extreme end, which also has a radially extending thrust surface, to a point axially beyond the staked supporting arrangement, the remainder of the bearing bore providing a surface for journaling the shaft. This enlarged bore insures the fact that there will be no interference with shaft rotation at the place of bearing securement and also provides a space for retaining a bead of lubricant adjacent the end of the bearing journal surface to keep lubricant away from the bearing thrust surface.

The subject matter which I regard as my invention is particularly pointed out and distinctly claimed in the concluding portion of this specification. My invention itself, however, both as to its organization and operation, together with further objects and advantages thereof, may best be understood by reference to the following description taken in connection with the accompanying drawings.

In the drawings:

FIG. 1 is a side view, partially broken away and partially in cross section, of an electric motor embodying the improved end shield assembly of the present invention in one form thereof;

FIG. 2 is a partially exploded side view of the end shield assembly shown in FIG. 1;

FIG. 3 is a partial side view in cross section showing the initial step in forming and assembling a sleeve type bearing onto the improved end shield assembly illustrated in FIGS. 1 and 2, illustrating the end shield member and an unfinished bearing blank as well as the apparatus used to perform the preferred method;

FIG. 4 is a similar view to FIG. 3 showing the next step in the preferred forming and assembly procedure of the invention;

FIG. 5 is a plan view, broken away in part, of the end shield member and the formed and sized sleeve type bearing secured at one of its ends to the end shield member prior to the removal of the bearing from the assembly apparatus; and FIG. 6 is a plan view of a portion of the end shield member and attached sleeve type bearing after it has been removed from the assembly apparatus shown in FIGS. 3–5 inclusive, but prior to the securement of the other end of the bearing.

Referring now to FIG. 1 of the drawings, there is shown a fractional horsepower electric motor, generally indicated by numeral 10, having a stator assembly 11 of standard construction and a rotor (not shown) suitably secured to a rotatable shaft 12. Stator assembly 11 includes a conventional magnetic laminated stator core (not illustrated), excitation winding 13, and an outer substantially cylindrical shell 14 suitably attached to the stator core. A pair of end frame or shield assemblies 15 and 16, made in accordance with the present invention and described in detail hereinafter, may be suitably secured to stator assembly 11 as by disposing an adhesive bonding material 17; e.g. such as thermosetting epoxy resin EA 200 (Shell Co.), between the outer peripheral surface of stator shell 14 and each of the respective end shield assemblies.

With specific reference to the improved end shield assembly constructed in accordance with the present invention, and in particular FIGS. 1 and 2, only end shield assembly 15 has been shown in detail for reasons of simplicity of illustration and description, but it is understood that the other end shield assembly 16 may be built in the same manner. In its preferred form, end shield assembly 15 comprises an end shield member 20, preferably stamped from a sheet of rigid material such as sheet steel or the like, having an outer axially extending wall section 21 adapted to be fixedly attached to stator shell member 14, and an inner generally cup-shaped wall section 22, spaced radially inward of and substantially parallel to the outer section 21, the sections being integrally joined by a wall 23. In the preferred form, a substantially cylindrical sleeve type bearing 24, composed of molded powdered sintered porous material such as sintered bronze, rotatably supports one side of rotor shaft 12, and has one of its end portions 25 projecting through an accommodating aperture 26 provided in wall section 22. End portion 25 is fixedly secured to wall section 22, preferably by a staked or swedged arrangement indicated by numeral 27. In addition, the extreme end of bearing end portion 25 is formed with a stationary radial extending surface 28 for receiving the axial thrust of the rotor and rotor shaft 12 during motor operation.

In order to complete the bearing mounting construction, a generally cup-shaped member 30, preferably stamped from suitable sheet steel material, is furnished to support the other end 29 of sintered bearing 24. In the illustrated embodiment, member 30 comprises a longitudinally extending substantially cylindrical outer wall section 31, telescopingly mounted within recess 32 defined by the inner axially extending surface of wall section 22, and a wall section 33 radially inward of outer wall section 31. Member 30 may be fixedly secured to end shield member 20, as by an interference fit between the telescoping parts of the respective members. Bearing end portion 29 projects into an accommodating aperture 35 provided centrally of wall section 33 and is secured thereto by an adhesive type bonding material 36, such as the same type of thermosetting resin mentioned above and indicated by numeral 17 in FIG. 1.

Referring now to sintered bearing 24, and especially FIGS. 1 and 2, the bore of the bearing is formed with a journal surface 37 for the greater part of its length to rotatably support shaft 12 and with an enlarged or countersunk bore portion 38 which has a larger diameter than the diameter of the journal surface of the bearing and preferably extends from thrust surface 28 to a point axially beyond the staked mounting structure 27 previously described. It will be seen that this construction insures the free rotation of rotor shaft 12 within the bearing during operation of motor 10 since the bearing is enlarged at the place of support; i.e., at the staked bearing mounting, and the bearing surface which journals the shaft is located axially away from the staked bearing end portion.

Further features of the foregoing arrangement will become more apparent as the description proceeds.

Turning once again to member 30, it will be seen that it not only provides a rigid and satisfactory support between end shield member 20 and bearing end portion 29 without adding stresses of any kind to the inherently weak sintered bearing, but in addition, along with the outer surface of the bearing body portions 39 located between the respective bearing end portions 25 and 29 and the inner surface of wall section 22, it also provides a substantially enclosed lubricant reservoir cavity. The cavity, which surrounds bearing body portion 39, may be substantially filled with lubricant retaining means, such as a pair of annular lubricant impregnated felt pads 40 and 41. Lubricant is supplied from the reservoir and fed to the bearing journal surface 37 at a predetermined rate radially through the porous sintered bearing body portion 39 in the manner well known in the art. Since in the preferred embodiment, the enlarged bore 38 extends just beyond the inner surface of wall section 22 of member 20, no excessive amount of lubricant will pass directly from the reservoir through the bearing to the enlarged bore without first wetting the journal surface 37 of the bearing. Further, the enlarged bore also provides a space for retaining a bead of lubricant (shown by numeral 18 in FIG. 1), which forms adjacent that end of the bearing journal surface during shaft rotation, and keeps the lubricant away from the thrust surface 28.

In addition to the foregoing, member 30 also serves to support a resilient motor mounting assembly, generally indicated by numeral 42 in FIGS. 1 and 2. In its preferred form, assembly 42 comprises a resilient annulus 43 for isolating motor vibrations fastened as by a press fit onto a metal cup 44 and disc 45, having a flanged outer periphery which is received in a recess 46 suitably formed in resilient annulus 43. Both cup 44 and disc 45 have aligned holes to permit shaft 12 to pass therethrough.

The manner in which the improved end shield assembly may be formed is shown by FIGS. 3–5 inclusive. The apparatus employed includes an assembly fixture or jig 50 for holding a substantially cylindrical sintered bearing blank 24a having an unfinished bore and for supporting end shield member 20, and a forming and sizing mechanism 51 movably disposed in a predetermined position above fixture 50. As illustrated, fixture 50 comprises a stationary cast housing 52 provided with a centrally disposed vertical bore 53 having an inclined wall 54 at the upper entrance thereof. In addition, the upper part of housing 52 which surrounds wall 54, has an outer cylindrical surface 55 adapted to cooperate with and engage the inner surface of wall section 22 of end shield member 20. A bearing holding sleeve 56 is slidably received in bore 53 and has a split collet portion 57 at its upper end formed with an outer inclined wall for sliding engagement with bore wall 54. A central tube 58, carried by sleeve 56, extends up to the collet portion of sleeve 56 and the upper end of tube 58, together with collet portion 57, defines a bearing accommodating recess.

The illustrated forming and sizing mechanism 51 may be lowered and raised relative to the fixture by any suitable means, such as by a hydraulic cylinder (not shown) and includes a vertically extending shaft formed with pin 59 at its lower end for sizing the journal part of the bearing bore, the outer surface of the pin being accurately dimensioned to the desired bearing bore size. In addition, the shaft has a counterbore 60 directly above pin 59 and a staking portion 61 formed with a curved surface 62 for staking the bearing blank 24a to the end shield member and for forming thrust receiving surface 28 on the finished bearing.

In the fabrication of my improved end shield assembly of the present invention, bearing blank 24a is initially placed in the collet recess in loose engagement thereto (FIG. 3), with forming and sizing mechanism 51 and sleeve 56 being respectively in their raised positions. End shield member 20 is arranged over the fixture with one end of bearing blank 24a projecting through end shield aperture 26. It should be noted at this point that the bore of bearing blank 24a is axially aligned with the shaft of raised mechanism 51.

Thereafter, mechanism 51 is lowered so that sizing pin 59 enters the bore of the bearing blank, the downward movement continuing until surface 62 contacts the extreme end of the bearing blank. This engagement forces sleeve 56 and tube 58 downwardly and with it, the bearing blank 24a. As the bearing blank and sleeve 56 move downward in fixture 50, the split collet portion 57 will slide on inclined wall 54 and the collet will be forced tightly against the outer surface of the bearing blank 24a, compressing the sintered bearing blank between sizing pin 59 and collet portion 57 until finally the bearing blank is held stationary within the collet recess. This squeezing operation accurately controls both the internal bore dimensions of the bearing blank and the porosity of the sintered bearing, which in turn, determines the rate of flow of lubricant radially through the finished bearing. It will be appreciated that the total vertical movement of the mechanism 51 relative to fixture 50 controls the degree of porosity which the sintered bearing will ultimately include. During the same operation, counterbore 60 of mechanism 51 enlarges the bearing bore to provide enlarged bore 38. At the same time, surface 62 and collet portion 57 form the thrust receiving surface 28 of the bearing and stakes or swedges the bearing onto end shield member 20 in a firm fashion, as illustrated by FIG. 4. Since the sintered bearing is very ductile, the bearing will in effect be forced around the end shield wall, which defines the bearing accommodating aperture 26, providing a shoulder on each side of end shield wall section 22 to hold firmly the bearing in the desired position.

Finally, mechanism 51 is raised and pin 59 is removed from the bearing bore. This has the additional effect of wiping or burnishing the journal surface 37 of the finished bearing 24, thereby insuring a smooth internal surface for carrying shaft 12. Mechanism 51 may be rotated, if desired, during its descent from its raised position as well as during the burnishing step outlined above. As the pin 59 wipes bearing surface 37, sleeve 56 with its split collet portion 57 is moved upwardly, releasing finished bearing 24 (FIG. 5), and end shield member 20 with the bearing firmly attached may readily be removed from fixture 50 without the need for additional force which might otherwise adversely affect the accurately finished bore surface attained during the prior manufacturing steps (see FIG. 6).

End shield assembly 15 may be completed by placing lubricant impregnated pads 40 and 41 around bearing 24 and pressing the outer wall section 32 of cup-shaped member 30 into the recess defined by wall section 22 of end shield member 20, with adhesive bonding material 36 in its uncured state being disposed between the outer surface of bearing end portion 29 and the overlapping inner surface of wall section 33 of cup-shaped member 30. Bonding material 36 is caused to be cured or hardened by any suitable means, e.g., kiln (not illustrated) to the point wherein it will retain the bearing and member 30 in a permanently fixed relationship. A plurality of holes 47 are provided in wall section 23 of member 20 and in member 30 to vent the lubricant reservoir to the atmosphere. These holes permit the air in the reservoir, which becomes heated and expands during the curing step, to escape from the reservoir so that the heated air will not force lubricant through the porous bearing, resulting in the loss of lubricant from the reservoir.

Should it be desired to utilize a lubricant slinger member on shaft 12 to return the small amount of lubricant which may creep along the shaft from lubricant bead 18 under adverse shaft load conditions, holes 47 serve to return the lubricant from the slinger member to the lubricant reservoir to establish a lubricant recirculation system. Under these circumstances, a lubricant slinger-thrust member (not illustrated), such as that disclosed and claimed in the copending patent application of P. B. Shaffer, Serial No. 803,010, filed Mar. 30, 1959, assigned to the same assignee as the present invention, may be employed adjacent thrust surface 28. When the recirculation system is used, a cap member 48 (FIG. 2) may be mounted to end shield wall section 22 radially beyond holes 47 to recapture lubricant thrown radially outwardly from the slinger-thrust member in the well known manner.

Prior to the aforementioned curing step, it is convenient to mount an end shield assembly on each side of stator assembly 11 having rotor and shaft 12 arranged in place within the stator assembly and to harden adhesive bonding material 17, disposed between the respective end shield assemblies and stator shell 14, during the same curing step mentioned above for hardening material 36. Once the end shield assembly has been produced in accordance with the foregoing, the resilient mounting assembly 42 may be press fitted onto cup-shaped member 30.

It will be recognized from the foregoing disclosures, that, by the present invention, an improved end shield assembly is provided in which the highly desirable, yet structurally weak sintered powder bearing is firmly and adequately supported at each end. In addition, even though an inexpensive staked supporting structure is used at one end of the sintering bearing, it does not adversely affect the rotation of the shaft within the bearing. Moreover, a stamped out low cost end shield member may be employed and the same structure which supports the bearing at both ends and forms a lubricant reservoir, also can be used to support a resilient motor mounting assembly.

While the present invention has been described by reference to a preferred embodiment thereof, it is to be understood that modifications may be made by those skilled in the art without actually departing from the invention. I therefore aim in the appended claims to cover all such equivalent variations as come within the true spirit and scope of the invention.

What I claim as new and desire to secure by Letters Patent of the United States is:

1. For use in an electric motor, an end frame assembly for supporting a shaft comprising a member formed of sheet material having a wall section formed with an aperture therethrough, a sleeve type bearing including a bore having a journal surface and first and second end portions, said first end portion projecting through said aperture, means securing said first end portion to said wall section, the bore in at least said first end portion being dimensionally greater in cross-section than the diameter of said journal surface, the dimensionally greater bore extending from the extreme end of said first end portion to a point axially beyond said aperture for insuring that the place of bearing support of said first end portion will not interfere with rotation of rotor shaft on said journal surface.

2. For use in an electric motor, an end shield assembly for supporting a rotor shaft comprising a first member formed of rigid sheet material having a wall section formed with an aperture therein, a sleeve type bearing having first and second end portions with said first end portion projecting through said aperture and being secured to said wall section, a second member formed from sheet material having an outer section rigidly attached to said first member and having an inner wall section extending inward thereof secured to said second bearing end portion, said bearing being formed with an enlarged bore in at least one end portion thereof, said enlarged bore extending from the extreme end of the one end portion to a point axially beyond the place of securement with the associated wall section for insuring that the place of bearing securement with the associated wall section will not interfere with the rotation of the rotor shaft.

3. For use in an electric motor, an end shield assembly for supporting a rotor shaft comprising a first member formed of rigid sheet material having a generally cup-shaped wall section defining a recess, a molded sintered sleeve type bearing having an inner journal surface and including a body portion and first and second end portions, said first end portion projecting through an aperture in said wall section and secured thereto, a generally cup-shaped second member formed from sheet material having outer and inner wall sections with a portion of said outer section rigidly secured within said recess, said second bearing end portion projecting through an aperture in and supported by said second member, said bearing being formed with an enlarged bore in at least one end portion from the extreme end thereof to a point axially beyond the adjacent aperture for insuring that the place of bearing support will not interfere with the rotation of the shaft, and a resilient mounting carried by and firmly attached to one of said wall sections.

4. For use in an electric motor, an end shield assembly for supporting a rotor shaft comprising a first member formed of rigid sheet material having a generally cup-shaped wall section defining a recess, a substantially cylindrical molded sintered sleeve type bearing having a bore and including a body portion and first and second end portions; said first end portion projecting through an aperture in said wall section, a generally cup-shaped second member of sheet material having outer and inner wall sections with a portion of said outer wall section fixedly secured within said recess, said second bearing end portion projecting through an aperture in said inner wall section, one of said bearing end portions being staked to and supported by the surrounding wall section and the other of said end portions being secured to the surrounding wall section by an adhesive bonding material, said bearing bore being enlarged from the extreme end of said staked end portion to a point axially beyond the aperture in the surrounding wall section for insuring that said staked end portion will not interfere with the rotation of the rotor shaft, and a resilient mounting carried by and firmly attached to one of said wall sections.

5. An electric motor including a stator, a shaft, a rotor fastened to said shaft, and a pair of substantially similar end shield assemblies, each of said end shield assemblies comprising a first member formed of rigid sheet material having generally cup-shaped wall section defining a recess, a substantially cylindrical molded sintered sleeve type bearing having a bore and including a body portion and first and second end portions, said first end portion projecting through an aperture in said wall section, a generally cup-shaped second member of sheet material having outer and inner wall sections with a portion of said outer wall section fixedly secured within said recess, said bearing body portion extending into said recess and said second bearing end portion projecting through an aperture in said inner wall section, one of said end portions staked to and supported by the surrounding wall section and the other end portion secured to the surrounding wall section by an adhesive bonding material, a resilient mounting carried by and firmly attached to one of said wall sections, the inner surfaces of the respective wall sections together with the outer surface of said bearing body portion defining a substantially closed lubricant reservoir cavity, lubricant retaining means disposed in said cavity, means between said cavity and said bearing bore for feeding lubricant to said bore at a predetermined rate, said bearing bore being enlarged from the extreme end of the staked end portion to a point axially beyond the aperture in the surrounding wall section for insuring that said staked end portion will not interfere with the rotation of said rotor shaft and for retaining a bead of lubricant.

References Cited by the Examiner
UNITED STATES PATENTS

| | | | |
|---|---|---|---|
| 2,358,669 | 9/44 | Thrush | 308—134.1 |
| 2,536,821 | 1/51 | Rappl | 29—149.5 |
| 2,685,658 | 8/54 | Feiertag | 310—90 |
| 2,832,906 | 4/58 | Koons | 310—90 |
| 2,845,552 | 7/58 | Robinson | 310—90 |
| 2,891,302 | 6/59 | Fuglie et al. | 29—149.5 |
| 2,947,893 | 8/60 | Bussone | 310—90 |
| 3,038,765 | 6/62 | Tupper | 310—90 X |

MILTON O. HIRSHFIELD, *Primary Examiner.*